United States Patent

Wang

Patent Number: 5,114,102
Date of Patent: May 19, 1992

[54] BOUNDARY LAYER CONTROL

[75] Inventor: Timothy Wang, Bellevue, Wash.

[73] Assignee: The Boeing Company, Seattle, Wash.

[21] Appl. No.: 417,910

[22] Filed: Oct. 6, 1989

[51] Int. Cl.$^5$ ............... B64C 21/04; B64C 21/00
[52] U.S. Cl. ................................................ 244/207
[58] Field of Search ......................... 244/207, 130

[56] References Cited

U.S. PATENT DOCUMENTS

| | | |
|---|---|---|
| 1,496,373 | 6/1924 | Hunt . |
| 2,348,792 | 5/1944 | Dornier . |
| 2,805,032 | 9/1957 | Davis . |
| 2,956,760 | 10/1960 | Attinello . |
| 3,085,740 | 4/1963 | Wagner . |
| 3,161,377 | 12/1964 | Balluff . |
| 3,259,341 | 7/1966 | Steidl .................... 244/207 |
| 3,321,157 | 5/1967 | Turner .................... 244/207 |
| 3,604,661 | 9/1971 | Mayer, Jr. . |
| 3,606,213 | 9/1971 | Lubimov . |
| 3,693,913 | 9/1972 | Barland, Sr. et al. . |
| 3,807,663 | 4/1974 | Bartoe, Jr. .................... 244/207 |
| 3,829,044 | 8/1974 | Leslie et al. .................... 244/207 X |
| 4,267,990 | 5/1981 | Staudacher .................... 244/207 X |
| 4,478,377 | 10/1984 | Fletcher et al. . |
| 4,478,378 | 10/1984 | Capuani .................... 244/12.5 |
| 4,674,716 | 6/1987 | Moore .................... 244/207 |
| 4,749,151 | 6/1988 | Ball et al. .................... 244/207 X |
| 4,860,976 | 8/1989 | McFadden et al. .................... 244/207 |

FOREIGN PATENT DOCUMENTS

| | | | |
|---|---|---|---|
| 1241405 | 8/1960 | France .................... 244/207 |
| 471177 | 8/1937 | United Kingdom .................... 244/207 |
| 1031339 | 6/1966 | United Kingdom .................... 244/207 |

*Primary Examiner*—Margaret A. Focarino
*Assistant Examiner*—James M. Kannofsky
*Attorney, Agent, or Firm*—Hughes & Multer

[57] ABSTRACT

Methods of and apparatus for controlling the separation of a boundary layer from a surface on which an adverse pressure gradient exists. A streamwise jet of fluid is so discharged onto the surface at a location adjacent the juncture between the surface and an adjoining structure as to energize the boundary layer and thereby delay the separation of the boundary layer from the airfoil in the vicinity of that juncture.

18 Claims, 3 Drawing Sheets

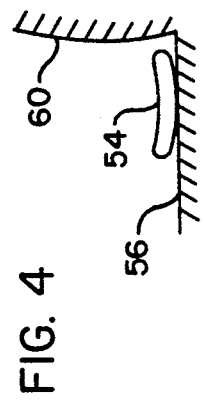
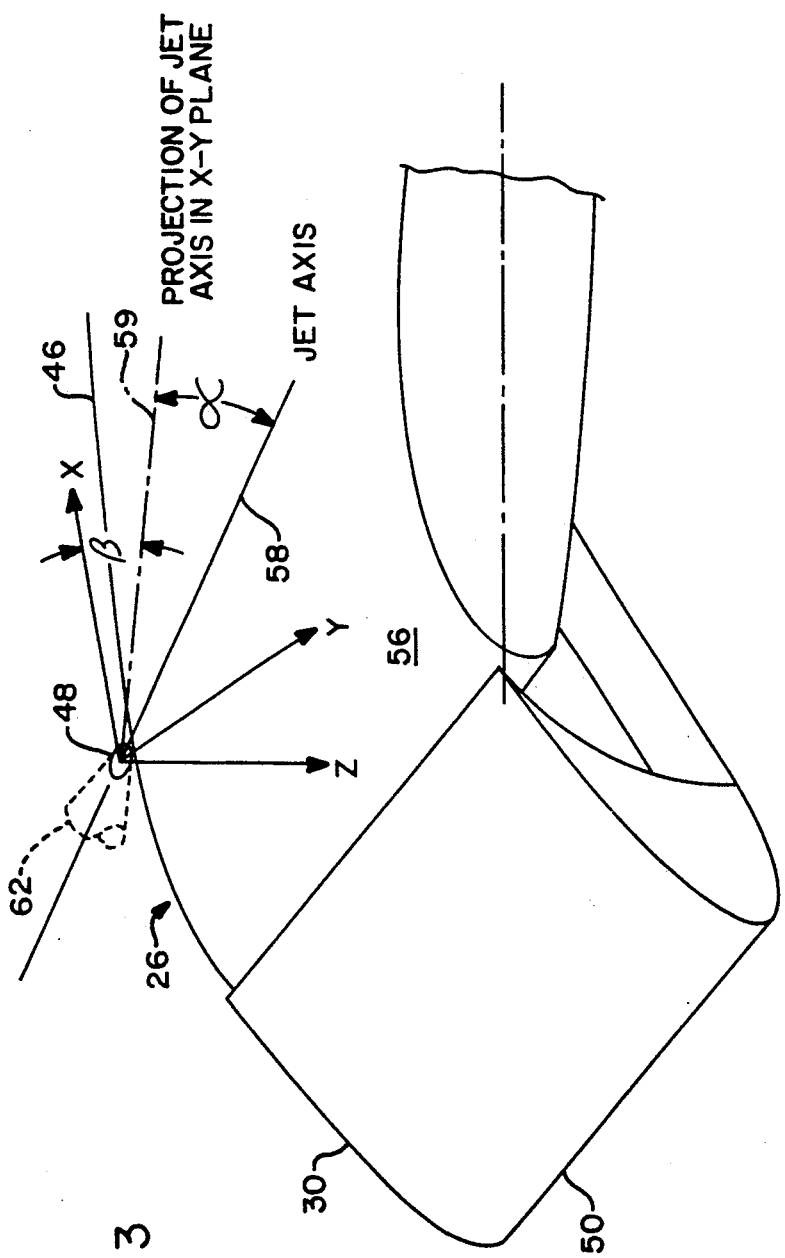
FIG. 3
FIG. 4

BOUNDARY LAYER CONTROL

TECHNICAL FIELD OF THE INVENTION

The present invention relates to novel, improved methods and systems for improving the aerodynamic flow of fluids in the vicinity of intersecting surfaces.

One currently important application of my invention is the controlling of the separation of a boundary layer from an airfoil-type aircraft component. In the interest of brevity and clarity, the principles of the present invention will be developed primarily with reference to that application. This, however, is not intended to limit the scope of the invention as defined in the appended claims.

BACKGROUND OF THE INVENTION

Separation of the boundary layer from an airfoil can cause a sharp drop in the lift generated by the airfoil. This can have such adverse results as reduced performance or an aircraft stalling and falling from the sky.

As is apparent from the following U.S. patents, for example, major efforts have been devoted to solutions of this separation problem: U.S. Pat. No. 3,085,740 issued Apr. 6, 1963 to Wagner for END INLET JET PUMP FOR BOUNDARY LAYER CONTROL SYSTEM; U.S. Pat. No. 3,161,377 issued Dec. 15, 1964 to Balluff for APPARATUS FOR CONTROLLING AIRCRAFT; U.S. Pat. No. 3,604,661 issued Sep. 14, 1971 to Mayer, Jr. for BOUNDARY LAYER CONTROL MEANS; and U.S. Pat. No. 3,693,913 issued Sep. 26, 1972 to Barland et al. for FLUID FLOW CONTROL DEVICE.

One of the significant problems which the foregoing patentees and other investigators have not successfully addressed, however, is the control of boundary layer separation at the intersection between an airfoil and an adjoining structure; for example, at the intersection between the wing and the body of an aircraft. Control of the boundary layer on an airfoil at an intersection with an adjoining structure has been experimentally attempted in two dimensional wind tunnel tests in which the wing or airfoil being evaluated spans the wind tunnel and the tunnel wall boundary layer as a consequence causes premature stall; i.e., separation of the boundary layer from the airfoil in the vicinity of the tunnel wall. One approach to solving this boundary layer separation problem used slot-type nozzles to direct a sheetlike jet of fluid along the wind tunnel wall and over a turntable on which the airfoil was supported. A second scheme used areawide suction in this same region of the test set-up.

Neither scheme was particularly successful. The more severe, separation-promoting pressure gradient exists along the surface of the airfoil; and this surface is left unprotected by the flow induced via the positive or negative pressure generated by the boundary layer control scheme. As a consequence, flow separation continued to occur at only a small distance from the tunnel wall and the turntable.

Furthermore, the amount of fluid employed by the pressurized sheet of fluid might well make that approach impractical for jet aircraft and similar applications in which the compressed air available for uses other than in propulsion units is very limited.

Thus, boundary layer separation continues as a problem in circumstances involving the juncture of an airfoil and an adjoining structure despite the efforts of previous investigators.

SUMMARY OF THE INVENTION

I have now invented, and disclosed herein, certain new and novel methods and systems for controlling the separation of the boundary layer from an airfoil at the intersection of two adjoining surfaces.

In the novel approach to the control of boundary layer separation disclosed herein, a round, streamwise, wall jet of fluid is directed onto the airfoil in the vicinity of the juncture between the airfoil and the adjoining structure. As it moves toward the rear of the airfoil, the jet of fluid spreads and energizes the boundary layer on the airfoil in the vicinity of the intersection. This controls, and inhibits the premature separation of, the boundary layer.

Of importance are the jet impingement angle $\alpha$ at which the jet impinges on the airfoil and the exit angle $\beta$ at which the jet is directed away from the surface of the adjoining structure. Both of these angles can be selected by trial and error for optimum separation control in a particular application of my invention. Angle $\beta$ will range from 10° to 45° and must be large enough to keep the jet of fluid from attaching to the adjoining structure by the Coanda effect. The angle $\alpha$, which will range from 0° to 30°, should be just large enough that the jet will impinge on the airfoil and spread or flatten into a configuration in which it is capable of energizing the boundary layer on the airfoil in the vicinity of the intersection between the airfoil and the adjoining structure.

THE PRIOR ART

I have identified above a number of previously issued U.S. patents which are concerned with boundary layer control but nevertheless do not address the particular boundary layer separation problem solved in such an elegant and simple fashion by the invention disclosed herein.

Another group of patent documents also appears at first blush to be relevant because the documents in this group disclose aircraft in which various types of flow nozzles are employed. In actuality, in each case, however, the flow nozzle arrangement is employed for a purpose quite unlike mine; viz., to promote the exhausting of combustion gases from a piston-type aircraft engine, to increase propeller loadings, to increase lift, to reduce drag, or to generate control forces.

The just-discussed patent documents are U.S. Pat. Nos.: 1,496,373 issued Jun. 3, 1924 to Hunt for AIRCRAFT; U.S. Pat. No. 2,348,792 issued May 16, 1944 to Dornier for PROPELLING PLANT FOR AIRCRAFT; U.S. Pat. No. 2,805,032 issued Sep. 3, 1957 to Davis for SUPERSONIC FLIGHT CONTROL DEVICE; U.S. Pat. No. 2,956,760 issued Oct. 18, 1960 to Attinello for CONTROLLABLE AND VARIABLE CONFIGURATION EFFECT SYSTEM FOR AIRCRAFT; U.S. Pat. No. 3,606,213 issued Sep. 20, 1971 to Lubimov for LAMINAR FLOW STRUCTURE; and U.S. Pat. No. 4,478,377 issued Oct. 23, 1984 to Fletcher et al. for AIRCRAFT and British Patent Specification No. 471,777 filed by de Paravinci for IMPROVEMENTS IN EXHAUST DISCHARGE ARRANGEMENTS FOR INTERNAL COMBUSTION ENGINES and accepted Aug. 30, 1937.

OBJECTS OF THE INVENTION

From the foregoing, it will be apparent to the reader that the primary object of the present invention resides in the provision of novel, improved methods and systems for controlling the separation of boundary layers from airfoils and other surfaces with adverse pressure gradients.

Other also important but more specific objects of the invention reside in the provision of boundary layer controlling methods and systems as described in the preceding object:

which are designed to control boundary layer separation in the vicinity of the juncture between a first surface as characterized in the preceding object and a second, adjoining surface;

which employs a jet of fluid to energize the boundary layer on the first surface and thereby promote the attachment of the boundary layer to the surface of the first surface;

which, in conjunction with the preceding object, utilize the spreading of a round jet into a flattened wall jet extending along the juncture of the structures to promote the attachment of the boundary layer to the first surface by energizing the boundary layer;

which utilize a jet of fluid in the control of boundary layer separation and which make only a modest demand on the available supply of that fluid; and which are effective and can be used in a wide range of applications including, but not limited to, those involving aircraft.

Other important objects and features and additional advantages of the invention will be apparent to the reader from the foregoing and the appended claims and as the ensuing detailed description and discussion proceed in conjunction with the appended claims.

BRIEF DESCRIPTION OF THE DRAWINGS

In the drawings:

FIG. 3 is a partial pictorial view of the aircraft wing and is included to show the geometry of a wall jet employed in the system of FIG. 2 and utilized to control boundary layer separation in the manner disclosed herein; and FIG. 4 is a section taken substantially along line 4—4 of FIG. 2 to show a flattening of the jet discharged from the nozzle, this flattening of the jet being utilized in the herein disclosed technique of controlling boundary layer separation.

DETAILED DESCRIPTION OF THE INVENTION

Figure 1:
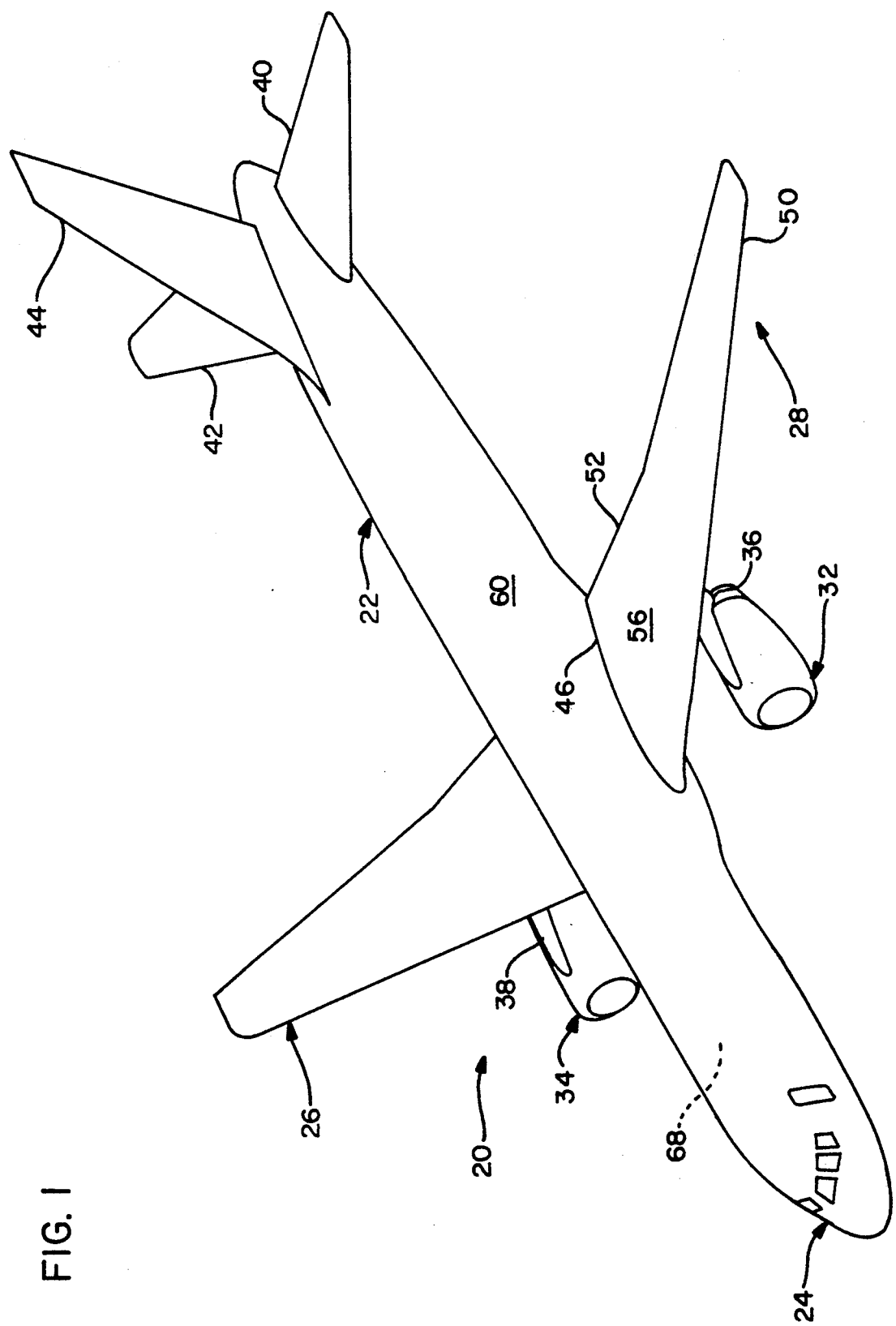
FIG. 1 is a pictorial view of an aircraft which may be provided with boundary layer control in accord with the principles of the present invention.

An aircraft in which the boundary layer control technique disclosed and claimed herein can be employed to advantage is depicted pictorially in FIG. 1 and identified by reference character 20. Aircraft 20 has a fuselage or body 22 with a flight deck 24 and left and right, sweptback wings 26 and 28 with leading edge flaps (one of these flaps is shown in FIG. 3 and identified by reference character 30). No. 1 and No. 2 engines 32 and 34 are supported from wings 26 and 28 by pylons 36 and 38. Aircraft 20 also has left and right horizontal stablizers 40 and 42 and a vertical stabilizer 44.

Boundary layer separation and the appurtenant loss of lift can be controlled in accord with the principles of the present invention in the vicinity of, for example, the juncture 46 between wing 26 and body 22 of aircraft 20.

As will be apparent from the drawings and the Summary of the Invention, this is accomplished by directing a round, streamwise jet of fluid 48 onto wing 26 from near the leading edge 50 of that wing and adjacent the juncture 46 between aircraft body 20 and wing 26 (by "streamwise" is meant "in the direction of the airstream over a surface being protected in accord with the principles of the present invention"). As it flows toward the trailing edge 52 of wing 26, jet 48 is flattened and spreads into the configuration 54 shown in FIG. 6, thereby energizing the boundary layer on the upper surface 56 of wing 26 and delaying its separation from that surface. This eliminates the unwanted loss of lift which would occur if the boundary layer prematurely separated from that surface.

Of importance, if not critical, for the reasons discussed above are the jet impingement angle $\alpha$ and the exit angle $\beta$ of the jet 48, 54.

Figure 2:
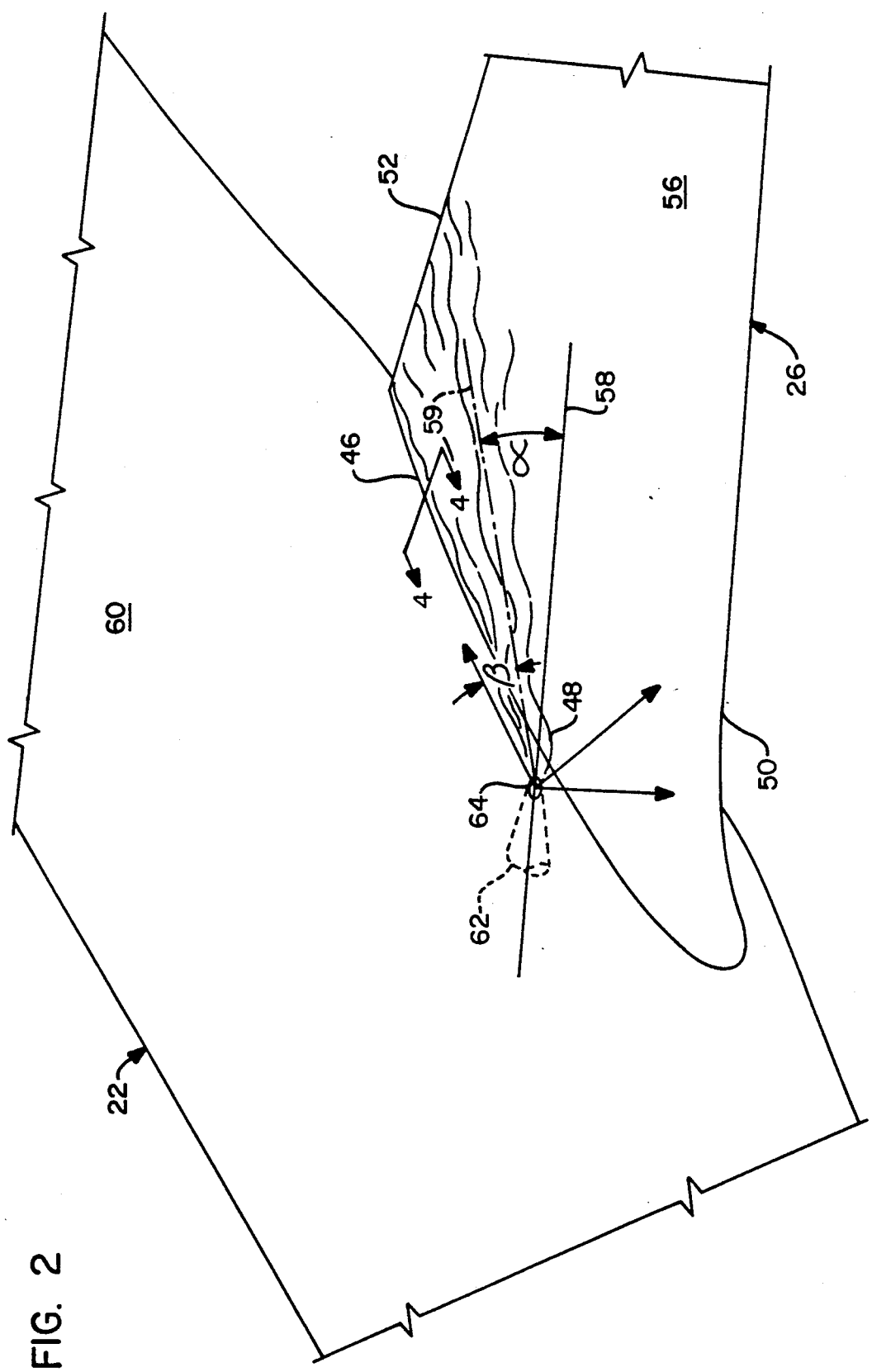
FIG. 2 is a pictorial view of: (1) that part of the aircraft in the vicinity of a wing/body juncture, and (2) a system embodying the principles defined herein and employed to delay or control the separation of the boundary layer from the wing in the vicinity of this juncture.

These angles are visually defined in FIGS. 2 and 3 by rectangular, x, y, z, coordinates. The x-y plane is parallel to the exterior surface 56 of wing 26, and the x-z plane is parallel to the external surface of the adjoining structure, in this case the surface 60 of aircraft body 22 (the axes x, y, and z may be orthogonally related but do not have to be).

The jet impingement angle $\alpha$ is formed by the axis 58 of jet 48, 54 and its projection 59 onto the x-y plane.

Exit angle $\beta$ is the angle between the projection 59 of axis 58 on the x-y plane and the x axis.

Angle $\alpha$ is in the range of 0° to 30°. Angle $\alpha$ is made just large enough in the particular application at hand for the initial, round jet of fluid 48 impinging on the upper surface 56 of wing 26 to spread into the streamwise wall jet 54 configuration which is shown in FIG. 6. Jet 48, 54 energizes the boundary layer and thereby controls its separation from airfoil surface 56.

The associated angle $\beta$ is in the range of 10° to 45°. It is made just large enough to keep jet 48, 54 from adhering to the external surface 60 of aircraft body 22 as a consequence of the Coanda effect.

The round, streamwise jet 48 may be generated and directed along axis 58 by the wall jet nozzle 62 illustrated in FIGS. 4 and 5. This nozzle has a circular or round outlet 64 and will preferably be a converging nozzle to minimize line loss. Typically, outlet 64 will be on the order of 1/10 to 1% of the local airfoil chord 25 in diameter, and the length of the nozzle will equal three to four diameters.

Nozzle 62 may be mounted in aircraft body 22 with its outlet 64 generally coextensive with the external surface 60 of the aircraft body. This is not essential, however. For example, nozzle 62 may instead be externally mounted and faired into external surface 60 or formed directly in that surface.

The fluid supplied to nozzle 62 for boundary layer control will typically be compressed air. In the exemplary application of my invention under discussion, this air can be routed to nozzle 62 from passenger cabin 68 of aircraft 20 or from the compressor of one of the aircraft's engines 32 or 34. Because only a single nozzle of relatively small diameter is employed, the demands on (at least ultimately) the compressor is small. As indicated above, this is particularly important, especially in aircraft applications of my invention in which compressed air for auxiliary purposes is at a premium.

The principles of the present invention have been developed above primarily with reference to the control or delay of boundary layer separation from an aircraft wing in the vicinity of the intersection between the wing and the aircraft body. This was done in the interests of clarity and brevity but is not intended to be limiting because the principles of the present invention may be employed in other aircraft areas with equally beneficial results—for example, at strut/wing and tail/-body junctures. Furthermore, the invention is not limited to aircraft application or even an airfoil and, indeed, can be utilized in any circumstances where an adverse pressure gradient exists on a surface in the vicinity of an intersection between that surface and an adjoining structure. For example, the invention can be used to delay the separation of a boundary layer from a diffuser. Therefore, what has preceded herein is not intended to limit that patent protection on my invention which is defined by the appended claims.

The invention may be embodied in still other forms and employed in many other settings without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A method of controlling the separation of a boundary layer from a first surface on which a sufficiently adverse pressure gradient exists in the vicinity of the juncture between that surface and the surface of an adjoining structure, said method comprising the step of so directing a jet of fluid issuing from the surface of the adjoining structure over the first surface and at an angle $\alpha$ between the longitudinal axis of the jet and the first surface and an angle $\beta$ between the surface of said adjoining structure and the longitudinal axis of the jet that said jet will flatten against said first surface and thereby control the separation of the boundary layer from said first surface by energizing the boundary layer on that surface, where $\alpha$ is in the range of 0° and 30° and $\beta$ is in the range of 10° and 45°.

2. A method as defined in claim 1 in which said angle $\beta$ is made large enough to prevent said jet from adhering to the adjoining structure by a Coanda effect.

3. A method as defined in claim 1 in which said jet is discharged onto said first surface at a location which is closely adjacent the juncture between the first surface and the surface of the adjoining structure.

4. A method as defined in claim 1 in which said jet of fluid is discharged onto the first surface from a nozzle with its outlet in said adjoining structure.

5. A method as defined in claim 1 in which a round jet of fluid is employed.

6. A method as defined in claim 1 in which said jet of fluid is discharged onto the first surface near the leading edge of said surface.

7. A method as defined in claim 1 in which said jet issues from a nozzle outlet which is coextensive with said surface of said adjoining structure.

8. A method as defined in claim 1 in which said first surface is on an airfoil.

9. A method as defined in claim 8 in which the airfoil and the adjoining structure are components of an aircraft.

10. A method as defined in claim 8 in which said jet issues from a nozzle outlet having a diameter on the order of 1/10 to 1% of a local chord of the airfoil.

11. The combination of a first structure; a second, adjoining structure; and means for controlling the separation of a boundary layer from a surface of the first structure on which an adverse pressure gradient exists in a region which is adjacent both the juncture between the first and adjoining structures and the leading edge of the first structure by directing a jet of fluid from said adjacent structure at an angle $\alpha$ between the longitudinal axis of the jet and the first surface and an angle $\beta$ between the surface said adjoining structure and the longitudinal axis of the jet, where $\alpha$ is in the range of 0° and 30° and $\beta$ is in the range of 10° and 45°.

12. A combination as defined in claim 11 in which the first structure and the adjoining structure are aircraft components.

13. A combination as defined in claim 12 in which the first structure is an airfoil.

14. A combination as defined in claim 11 in which the means for controlling separation of the boundary layer comprises means for discharging said jet of fluid along the surface of the first structure and toward the trailing edge thereof from a location adjacent the leading edge of the first structure.

15. A combination as defined in claim 14 in which the means for discharging said jet of fluid has a round outlet and the jet of fluid discharged therefrom is thereby also round.

16. A combination as defined in claim 14 in which the means for discharging the jet of fluid is housed in said second structure.

17. A combination as defined in claim 14 in which said first structure is an airfoil and an outlet of said means for discharging said jet of air has a diameter on the order of 1/10 to 1% of a local chord of the airfoil.

18. A combination as defined in claim 14 in which an outlet of said means for discharging said jet of fluid is coextensive with a surface of said second adjoining structure.

* * * * *